US006114772A

United States Patent [19]

Araki et al.

[11] Patent Number: 6,114,772

[45] Date of Patent: Sep. 5, 2000

[54] STARTER HAVING PINION ROTATION RESTRICTING MEMBER AND PLUNGER MOVEMENT RESTRICTING MEMBER

[75] Inventors: Takeshi Araki, Nishikasugai-gun; Keiichi Matsushima, Toyota, both of Japan

[73] Assignee: Denso Corporation, Kariya, Japan

[21] Appl. No.: 09/120,189

[22] Filed: Jul. 22, 1998

[30] Foreign Application Priority Data

Oct. 20, 1997 [JP] Japan .................................... 9-286432

[51] Int. Cl.$^{7}$ ................................ F02N 11/08; H02P 9/04

[52] U.S. Cl. ........................ 290/48; 290/38 A; 290/38 B; 290/38 D; 290/49

[58] Field of Search .................................... 290/48, 48 A, 290/48 B, 48 C; 310/75 D

[56] References Cited

U.S. PATENT DOCUMENTS

| | | | |
|---|---|---|---|
| 3,584,229 | 6/1971 | West . | |
| 5,525,947 | 6/1996 | Shiga et al. | 290/48 |
| 5,610,445 | 3/1997 | Shiga et al. . | |
| 5,656,981 | 8/1997 | Niimi et al. | 290/48 |
| 5,777,393 | 7/1998 | Katoh et al. | 290/48 |
| 5,814,896 | 9/1998 | Araki | 290/38 R |
| 5,945,742 | 8/1999 | Araki et al. | 290/38 R |

FOREIGN PATENT DOCUMENTS

| | | |
|---|---|---|
| 742367A1 | 11/1996 | European Pat. Off. . |
| 7-174062 | 7/1995 | Japan . |
| 9-190758 | 7/1997 | Japan . |

*Primary Examiner*—Elvin Enad

*Attorney, Agent, or Firm*—Pillsbury Madison & Sutro LLP

[57] ABSTRACT

In a starter, a plate that turns with a pinion moving body is disposed behind the pinion moving body. The plate has a receiving part that engages with the lower extension of a rotation restricting member for restricting the rotation of the pinion moving body until a pinion gear engages with a ring gear. In a power supply circuit for a starter motor, a first switch and a second switch are provided. The first switch turns on first to energize the starter motor. When the pinion gear engages with the ring gear thereafter, the second switch turns on to energize further the starter motor by short-circuiting a resistor wire.

14 Claims, 6 Drawing Sheets

STARTER HAVING PINION ROTATION RESTRICTING MEMBER AND PLUNGER MOVEMENT RESTRICTING MEMBER

CROSS REFERENCE TO RELATED APPLICATION

This application relates to and incorporates herein by reference Japanese patent application No. 09-286432 filed on Oct. 10, 1997.

BACKGROUND OF THE INVENTION

1. Field of the Invention

The present invention relates to a starter for starting an engine and, more particularly, to a starter having two-stage rotation speed control.

2. Related Art

The engine compartment of a vehicle is recently packed with more and more engine component parts such as electric accessory equipment. Therefore, reduction in size of a starter is required to meet this over-packed condition. It is proposed, for reducing the size of the starter, to change the moving system of a pinion that engages with the ring gear of the engine.

For instance, in U.S. Pat. No. 5,610,445 (JP-A-7-233770), the pinion that engages with the output shaft of a starter motor through a helical spline is restricted from rotating when the output shaft rotates in response to the rotating force of the starter motor, thus advancing the pinion to the engine ring gear side by the action of the helical spline. This system enables to reduce the weight of object that is to be driven by an electromagnetic switch in comparison with the currently used system in which an electromagnetic switch drives the pinion that is integral with a clutch. That is, the object to be driven is changed from the heavy weight clutch-integral pinion to a light weight pinion rotation restricting member. Thus, the required work power of the electromagnetic switch can be reduced remarkably, thereby reducing the electromagnetic switch to a smaller size and less electric power consuming.

In the starter using the pinion rotation restricting system, however, the whole output of the starter motor produced from the electric power of a power source such as a battery is applied to the pinion. When the pinion engages the ring gear, the pinion collides with the ring gear at high torque and high rotational speed, causing high collision.

It is proposed in U.S. patent application Ser. No. 08/642,942 filed on May 6, 1996 (JP-A-9-217672) to reduce the collision, that will be caused at the time of engagement, by restricting the output of the starter motor until the pinion advances and abuts the side surface of the ring gear. This system has a first power supply circuit that supplies the electric power to the starter motor through an electric resistor and a second power supply circuit that supplies the electric power to the starter motor by short-circuiting the electric resistor. A first switch and a second switch are provided in the first power supply circuit and the second power supply circuit, respectively, and constructed to turn on sequentially in accordance with the distance of movement of the plunger of the electromagnetic switch. That is, until the pinion completely engages with the ring gear; the first switch turns on first in response to the movement of the plunger to supply the starter motor with electric current that is reduced by the electric resistor. Thus, the starter motor rotates at low torque and low rotational speed. Thereafter, when the plunger moves further and turns on the second switch, the electric resistor is short-circuited to supply the starter motor with the required electric current so that the starter motor rotates at high torque and high rotational speed.

In the case of the starter using the pinion rotation restricting system in which two-stage switch structure, however, the pinion rotation restricting member bends with the movement of the plunger before the pinion engages the ring gear when the spring constant of the resilient material for the pinion rotation restricting member is low. That is, it is desired that, while the pinion rotation restricting member is in pinion rotation restriction operation, the plunger linked with the pinion rotation restricting member is restricted from moving thereby to turn on only the first switch. When the pinion rotation restricting member bends, however, it may occur that the plunger will not be restricted from moving and will move to the final position to turn on the second switch undesirably. As a result, the electric resistor will be short-circuited and the full electric power will be supplied to the starter motor, before the pinion advances to the position of engagement with the ring gear. Thus, the starter motor rotates at high torque and high rotational speed, disabling the restriction of high collision impact at the time of engagement between the pinion and the ring gear.

SUMMARY OF THE INVENTION

The present invention has an object to provide a starter that, in a system having a two-stage switch structure in a power supply circuit, can restrict motor output assuredly by restricting a second switch from being turned on until a pinion engages with a ring gear.

According to the present invention, in addition to a pinion rotation restricting member, a plunger movement restricting member is provided to restrict a plunger from moving until a pinion moving body restricted from rotating by the rotation restricting member advances a predetermined distance on an output shaft by a rotation of the output shaft after a first contact is turned on. Thus, a second switch will not turn on until the pinion moving body advances on the output shaft the predetermined distance, e.g., to the position where teeth of the pinion gear and the ring gear can resist the impact shock caused at the time of engagement between the pinion and the ring gear, when the pinion gear engages with the ring gear to a certain extent in an axial direction to transmit the rotation energy of the starter motor). Therefore, the pinion gear can be restricted from engaging with the ring gear at high rotational speed and the impact shock at the time of engagement can be reduced to low.

Preferably, the plunger movement restricting member has an engagement part movable together with the pinion moving body the rotation restricting member has an engagement part movable together with the plunger. The plunger movement restricting member can restrict the movement of the plunger by restricting the movement of the rotation restricting member after the turn-on of the first switch. When the pinion moving body advances the predetermined distance on the output shaft thereafter, the movement restricting member moves with the pinion moving body and the rotation restricting member disengages from the movement restricting member to enable the movement of the plunger for the turn-on of the second switch.

More preferably, the rotation restricting member is provided integrally with a resilient part and the abutment thereof with the movement restricting member is released when the pinion moving body advances the predetermined distance on the output shaft. Thus, because the rotation restriction to the pinion moving body is released when the pinion gear engages with the ring gear, the pinion moving body (pinion gear) can rotate with the output shaft to rotate the ring gear.

BRIEF DESCRIPTION OF THE DRAWINGS

Other objects, features and advantages of the present invention will become more apparent from the following detailed description made with reference to the accompanying drawings. In the drawings:

FIG. 6 is a sectional view of the starter showing that a first switch is turned on;

FIG. 7 is a sectional view of the starter showing that a second switch is turned on.

DETAILED DESCRIPTION OF THE PREFERRED EMBODIMENT

A starter according to the present invention will be described with reference to the drawings.

Figure 1:
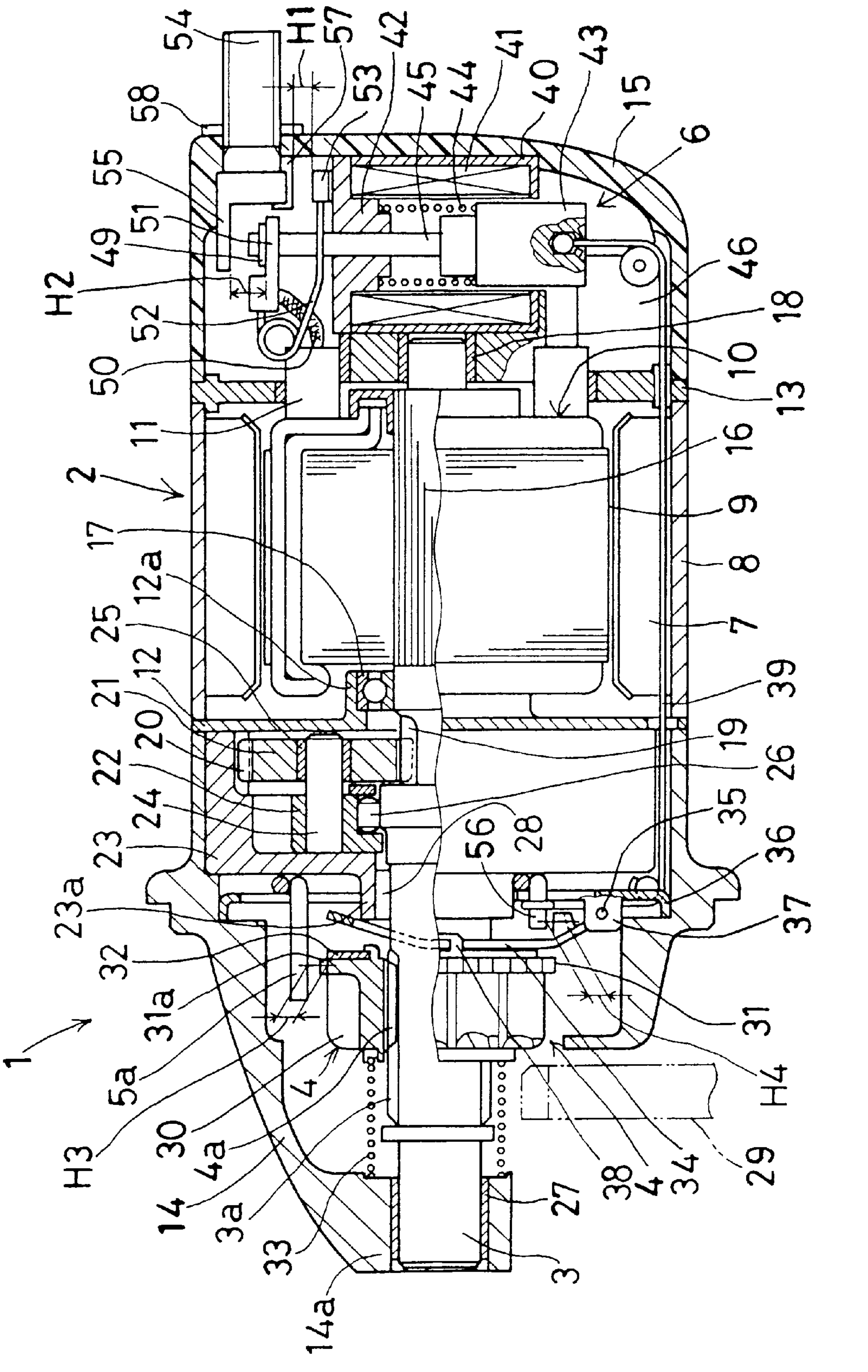
FIG. 1 is a sectional view showing a starter according to an embodiment of the present invention.

In FIG. 1 showing an embodiment of the present invention, a starter 1 is constructed by a starter motor 2 for generating a rotary force, a planetary gear speed reduction mechanism for reducing the rotation of the starter motor 2, an output shaft 3 for rotating by receiving the rotary output of the speed reduction mechanism, a pinion moving body 4 fitted around the outer periphery of the output shaft 3, a rotation restricting member 5 (FIG. 3) for restricting rotation of the pinion moving body 4 at the time of starting to energize the starter motor 2, an electromagnetic switch 6 for driving the rotation restricting member 5 and controlling electric power supply to the starter motor 2 and the like.

The starter motor 2 is constructed by a yoke 8 provided with fixed magnetic poles 7 on its inner peripheral surface, an armature 9 disposed rotatably inside of the fixed magnetic poles 7, brushes 11 for sliding over a commutator 10 provided on the armature 9, and the like.

The yoke 8 is shaped cylindrically and sandwiched between a front casing 14 and a rear casing 15 together with a partition plate 12 disposed at its front end and a holder plate 13 disposed at its rear end. The fixed magnetic poles 7 comprise a plurality of permanent magnets, for instance. Each permanent magnet is fixed to the yoke 8 with a fixed spacing from the adjacent one in a circumferential direction. The armature 9 has a rotary shaft 16 that has one end side supported rotatably by a bearing 17 held in a bearing part **12*a* of the partition wall 12 and having the other end side supported rotatably by a bearing 18 supported in the inner peripheral part of the holder plate 13. The commutator 10 is provided so that its sliding surface against the brushes 11 is in generally perpendicular relation with the rotary shaft 16 of the armature 9. Each brush 11 is held by the holder plate 13 and is biased to the sliding surface of the commutator 10** by a spring (not shown).

The speed reduction mechanism is constructed by a sun gear (external gear) 19 formed on the outer periphery of the one end side of the rotary shaft 16, an internal gear 20 formed around the radially outer periphery of the sun gear 19, a plurality of planetary gears 21 disposed between the sun gear 19 and the internal gear 20 to engage with the gears 19, 20, and a carrier part 22 for supporting each planetary gear 21.

The sun gear 19 transmits the rotation of the rotary shaft 16 to each planetary gear 21. The internal gear 20 is formed on a center casing 23 accommodated in the inner periphery of the rear cylindrical part of the front casing 14 at the side of yoke 8. The center casing 23 is restricted from turning by the inner peripheral surface of the front casing 14. Each planetary gear 21 is supported rotatably by a pin 24 press-fitted into the carrier part 22 through a bearing 25. The carrier part 22 is disposed on the outer periphery of the rear end side of the output shaft 3 coaxially with the output shaft 3 and rollers 26 are interposed in a space against the outer peripheral surface of the rear end of the output shaft 3, thereby providing a one-way clutch. This one-way clutch transmits the rotary output of the speed reduction mechanism (i.e., rotation of the carrier part 22) to the output shaft 3 through the rollers 26.

The output shaft 3 is disposed coaxially with the rotary shaft 16 and has one end supported rotatably through a bearing 27 held by the bearing part **14*a* of the front casing 14 and the other end side supported rotataby through a bearing 28 held in the inner cylindrical part 23*a* of the center casing 23. Thus, the output shaft 3 is restricted from moving in the axial direction against the center casing 23. A helical spline 3*a* is formed on the outer peripheral surface of the output shaft 3 extending forward from the center casing 23. A helical spline 4*a* formed on the inner periphery of the pinion moving body 4 is fitted with the helical spline 3*a***.

The pinion moving body 4 is formed with a pinion gear 30 integrally for meshing engagement with a ring gear 29 provided on the driving shaft (crankshaft) of an engine. At the rear end side of the pinion gear 30 (right end side in FIG. 1), a flange 31 that is larger in diameter than the pinion gear 30 and has a plurality of teeth **31*a* on its outer periphery is formed integrally. A thrust washer 32 is provided at the rear end surface of the flange 31 and is held rotatably against the flange 31. The pinion moving body 4 is normally biased toward the rear by a spring 33 interposed in a space provided adjacent to the bearing part 14*a* of the front casing 14**.

Figure 2:
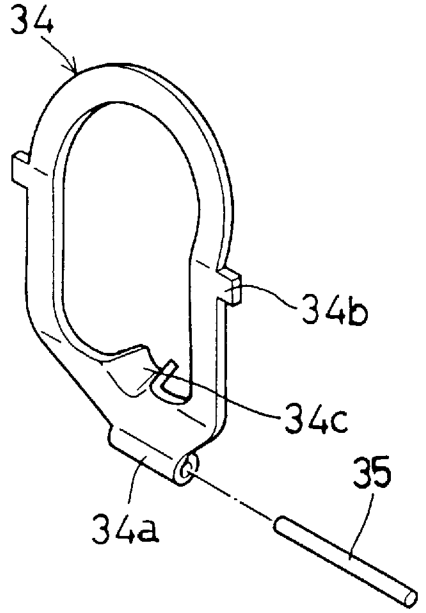
FIG. 2 is a perspective view showing a plate having a first engagement part used in the embodiment shown in FIG. 1.

A plate 34 is disposed behind the pinion moving body 4 to be movably with the pinion moving body 4. As shown in FIG. 2 in detail, the plate 34 is shaped into an annular or ring-like body having a shaft supporting part 34*a* at its lower end side. A rotary shaft 35 is inserted into the shaft supporting part 34*a* and supported rotatably in the supporting part 37 of a plate 36 fixed closely to the center casing 23. The annular body 34 has on its both lateral sides a pair of protrusions 34*b* that are fitted into the longitudinal holes provided on a pair of projecting pieces 38 of the pinion moving body 4. The projecting pieces 38 are provided on both outer sides of the thrust washer 32. Thus, the plate 34 is enabled to turn around the rotary shaft 35 with its projections 34*b* being engaged with the longitudinal holes of the projecting pieces 38, when the pinion moving body 4 advances forward on the output shaft 3.

Further, a receiving part 34*c* that extends rearwardly from the plate 34 is provided at the inner periphery of the bottom side of the annular body.

Figure 3:
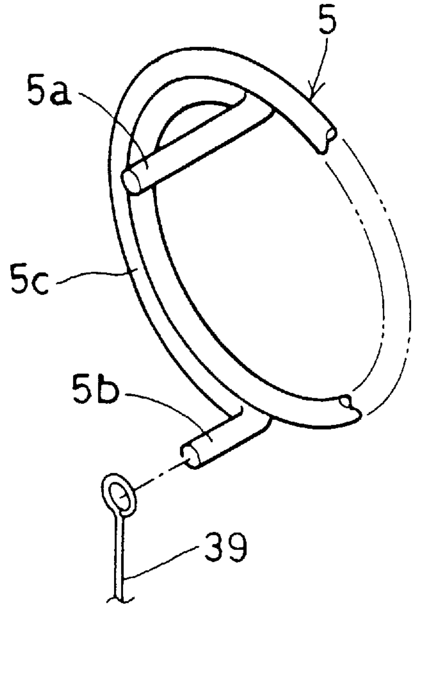
FIG. 3 is a perspective view showing a rotation restricting member used in the embodiment shown in FIG. 1.

The rotation restricting member 5 is made, as shown in FIG. 3 in detail, by winding a wire material having a resiliency into a loop and bending generally perpendicularly both ends as extensions 5*a*, 5*b* in the same direction (i.e., toward the pinion moving body 4). This rotation restricting member 5 is held movably in an up-down direction between the plate 36 and the center casing 23 with its looped part 5*c* being disposed around the outer periphery of the inner cylindrical part 23*a*. Both extensions 5*a*, 5*b* bent perpendicularly are extended to the front side of the plate 36 through an opening (not shown) formed in the plate 36. The upper extension 5*a* is located above the pinion moving body 4 in a radial direction, while the lower extension 5*b* is located at the position opposite to the upper extension 5*a* in the radial direction.

The upper extension 5*a* is located with a predetermined spacing from the outer peripheral surface of the flange 31 when the starter 1 is not in operation (FIG. 1). The lower extension 5*b* is located above the receiving part 34*c* of the plate 34 and has a length to abut the receiving part 34*c* when the rotation restricting member 5 is moved downward. However, the length of the lower extension 5*b* is set so that it may be disengaged from the receiving part 34*c* at the time when the pinion moving body 4 advances to the position where the pinion gear 30 engages with the ring gear 29 completely.

Further, one end of a cord-like member 39 such as a wire is connected to the lower extension 5*b* to transmit the driving force of the electromagnetic switch 6.

This rotation restricting member 5 is normally biased upward in FIG. 1 by a spring (not shown) fixed to the plate 36. Thus, when the driving force of the electromagnetic switch 6 is transmitted through the cord-like member 39, the rotation restricting member 5 is moved downward in FIG. 1 against the biasing force of the spring. When the driving force of the electromagnetic switch 6 disappears, it is returned upward by the reaction force of the spring.

The electromagnetic switch 6 drives the rotation restricting member 5 through the cord-like member 39 and controls the supply of electric power to the starter motor 2 by turning on and off a first switch and a second switch provided in an electric power supply circuit (FIG. 4) for the starter motor 2.

Figure 5:
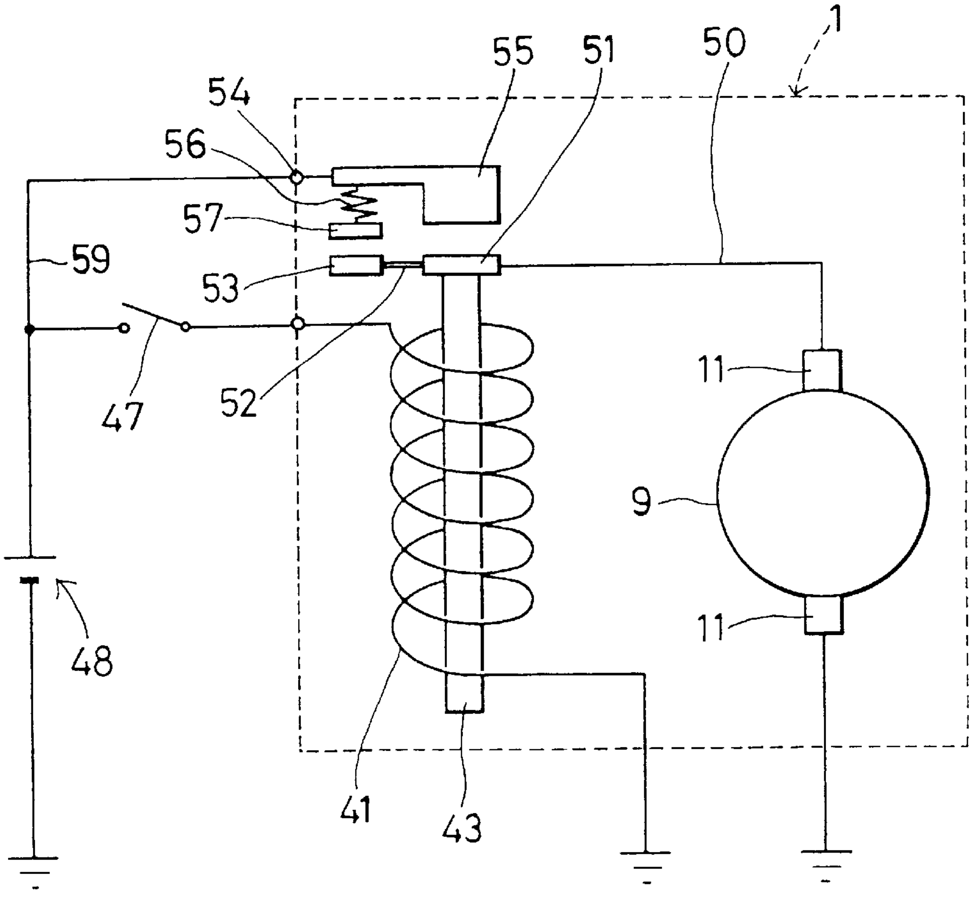
FIG. 5 is a perspective view showing a switch provided in the power supply circuit shown in FIG. 4.

This electromagnetic switch 6 is constructed by a switch cover 40, coil 41, fixed core 42, plunger 43, return spring 44, rod 45 and the like. It is supported on a base 46 fixed to the holder plate 13 and is accommodated within the rear casing 15. The switch cover 40 is made of a magnetic material (e.g., iron) and is pressed to a cup shape. It has an insertion hole in the middle part of the cover bottom (lower part in FIG. 1) for receiving the plunger 43 slidably therein. The coil 41 is connected, as shown in FIG. 5, to a vehicle-mounted battery 48 through a key switch 47 to generate magnetic force when energized by the turn-on of the key switch 47. The fixed core 42 is made of a magnetic material (e.g., iron). It is disposed on the upper side of the coil 41 and is fixedly fitted in the opening of the switch cover 40.

The plunger 43 is made of a magnetic material (e.g., iron) and is shaped cylindrically. It is disposed slidably within the hollow inner space of the coil 41 to be attracted toward the fixed core 42 by the magnetic force generated by the coil 41. The other end of the cord-like member 39 is connected to the bottom of the plunger 43. The return spring 44 is disposed between the plunger 43 and the fixed core 42 within the inner periphery of the coil 41 to normally bias the plunger 43 downward in FIG. 1 from the fixed core 42. The rod 45 is fixed to the upper end of the plunger 43 and passes slidably through the central through-hole of the fixed core 42 to protrude upward from the fixed core 42.

Figure 4:
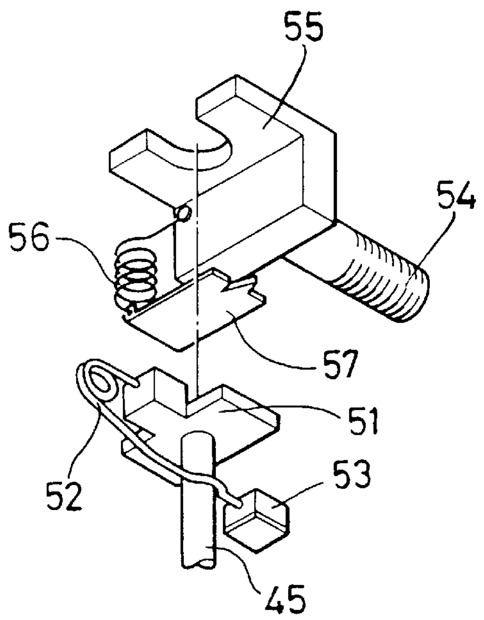
FIG. 4 is a circuit diagram showing a power supply circuit for a starter used in the embodiment shown in FIG. 1.

Provided in the power supply circuit for the starter motor 2 are, as shown in FIGS. 4 and 5, a main movable contact 51 attached to the upper end of the rod 45 through an insulation bushing 49 (FIG. 1) and connected electrically to the positive-side brush 11 through a lead wire 50 (FIGS. 1, 5), an auxiliary movable contact 53 connected to the main movable contact 51 through a resilient member 52 (e.g., a spring made of phosphorous bronze) having a good electrical conductivity, a main fixed contact 55 provided integrally with a battery terminal 54, and an auxiliary fixed contact 57 connected to the main fixed contact through a resistor wire 56 such as a nickel-chrome wire. The auxiliary movable contact 51 and the auxiliary fixed contact 57 constitute a fist switch, while the main movable contact 51 and the main fixed contact 55 constitute a second switch. The battery terminal 54 is fixed to the rear casing 15 through a washer 58 (FIG. 1) and is connected to the battery 48 through a cable 59.

For assuring that the first switch is turned on earlier than the second switch when the plunger 43 is attracted upward to move the main movable contact 51 and the auxiliary movable contact 53, the second contact distance (distance between the main movable contact 51 and the main fixed contact 55) H2 is set longer than the first contact distance (distance between the auxiliary movable contact 53 and the auxiliary fixed contact 57) H1.

Those contact distances H1, H2 are further set to satisfy the following relation against distances H3, H4, with the distance H3 being between the upper extension 5*a* of the rotation restricting member 5 and the tooth bottom of the flange 31 and the distance H4 being between the lower extension 5*b* and the bottom of the receiving part 34*c* of the plate 36.

$$H3 \approx H4,\ H2 > H4 > H1 \text{ (and } H2 > H3\text{)}$$

The starter of the present embodiment will operate as follows.

Figure 6:
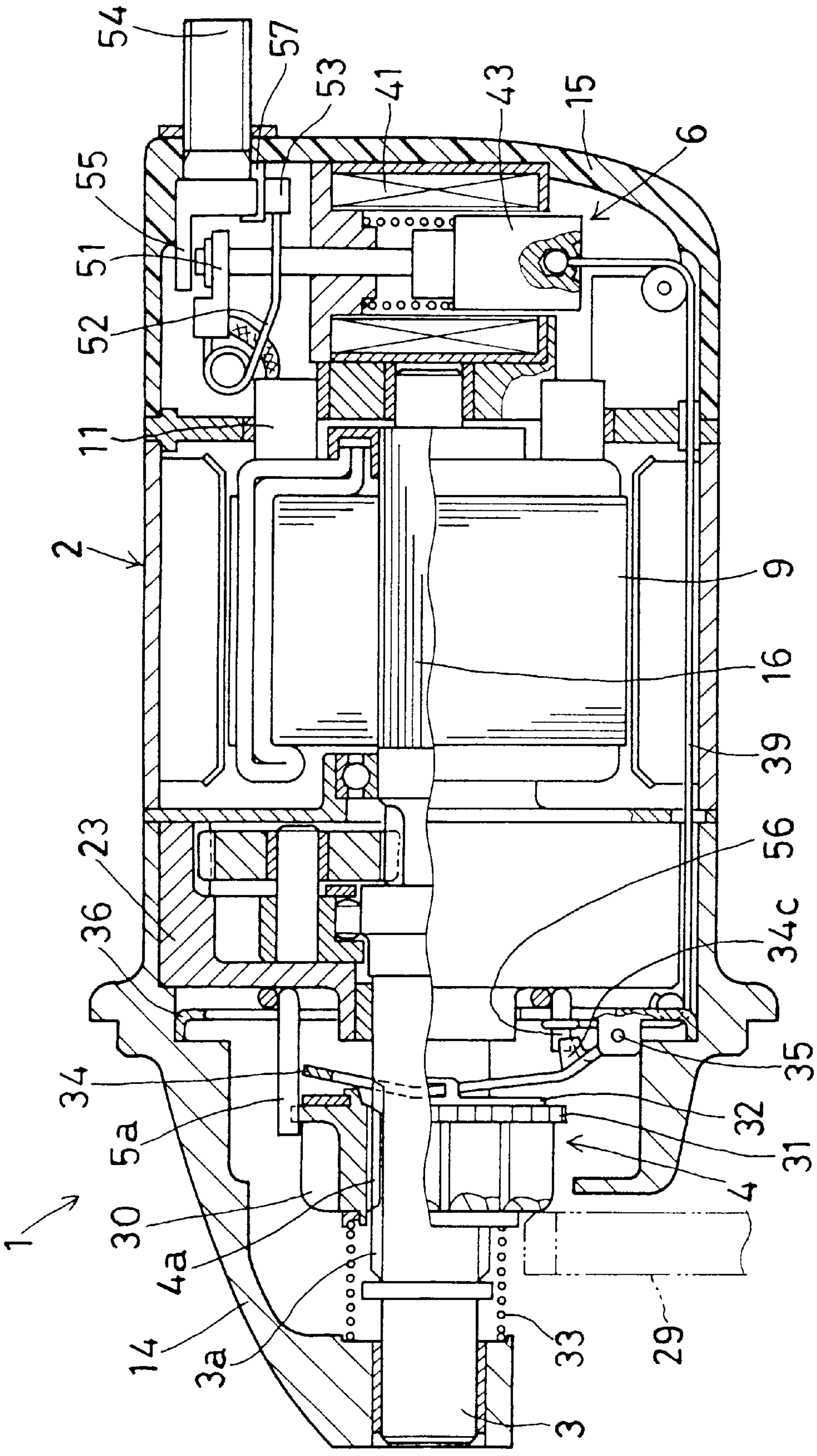

When the key switch 47 is turned on, the magnetic force is generated by the current flow (power supply) from the battery 48 to the coil 41 of the electromagnetic switch 6, so that the plunger 43 is attracted upward in FIG. 1 by this magnetic force. The movement of the plunger 43 moves the rotation restricting member 5 downward in FIG. 1 through the cord-like member 39 while flexing the spring that normally biases the rotation restricting member 5. The upper extension 5*a* of the rotation restricting member 5 moves down to engage with the tooth 31*a* provided on the outer periphery of the flange 31 of the pinion moving body 4 thereby to restrict the rotation of the pinion moving body 4 (FIG. 6).

When the rod 45 moves upward along with the movement of the plunger 43, the auxiliary movable contact 53 abuts first the auxiliary fixed contact 57 to turn on the first switch. Thus, the current supplied from the battery 48 flows to the armature 9 through the resistor wire 56, first switch, conductive resilient member 52, main movable contact 51 and brush 11. As the resistor wire 56 restricts the current to the armature 9 at this moment, the armature 9 rotates at lower speeds than when the rated full voltage is applied.

The rotation of the armature 9 is transmitted to the output shaft 3 after being reduced in speed by the speed reduction mechanism to rotate the output shaft 3. The pinion moving body 4 tends to rotate with the output shaft 3. However, as the pinion moving body 4 is restricted from rotating by the upper extension 5*a* of the rotation restricting member 5, the pinion moving body 4 advances forward on the output shaft 3 by an actin of the helical splines 3*a*, 4*a*. When the end surface of the pinion gear 30 collides with the end surface of the ring gear 29 (FIG. 6), the pinion moving body 4 is restricted from advancing further. Thus, the pinion moving body 4 starts to rotate with the upper extension 5*a* being maintained engaged with the tooth 31*a* of the flange 31. At this moment, the upper extension 5*a* is pulled by the rotation of the pinion moving body 4 and bends in the direction of rotation while being maintained engaged with the tooth 31*a* of the flange 31.

At the time the upper extension 5*a* engages with the tooth 31*a* of the flange 31, the lower extension 5*b* abuts the receiving part 34*c* of the plate 34 that turns along with the movement of the pinion moving body 4. While the end surface of the pinion gear 30 is in contact with the end surface of the ring gear 29 and the pinion moving body 4 is restricted from advancing, the rotation restricting member 5 is also restricted from moving downward. Although the plunger 43 is maintained attracted during this period, the plunger 43 is also restricted from moving further because the plunger 43 is connected to the lower extension 5*b* through the cord-like member 39. Thus, the power supply circuit for the starter motor 2 is held in the condition in which the first switch is maintained turned on (i.e., the second switch is maintained turned off).

Figure 7:
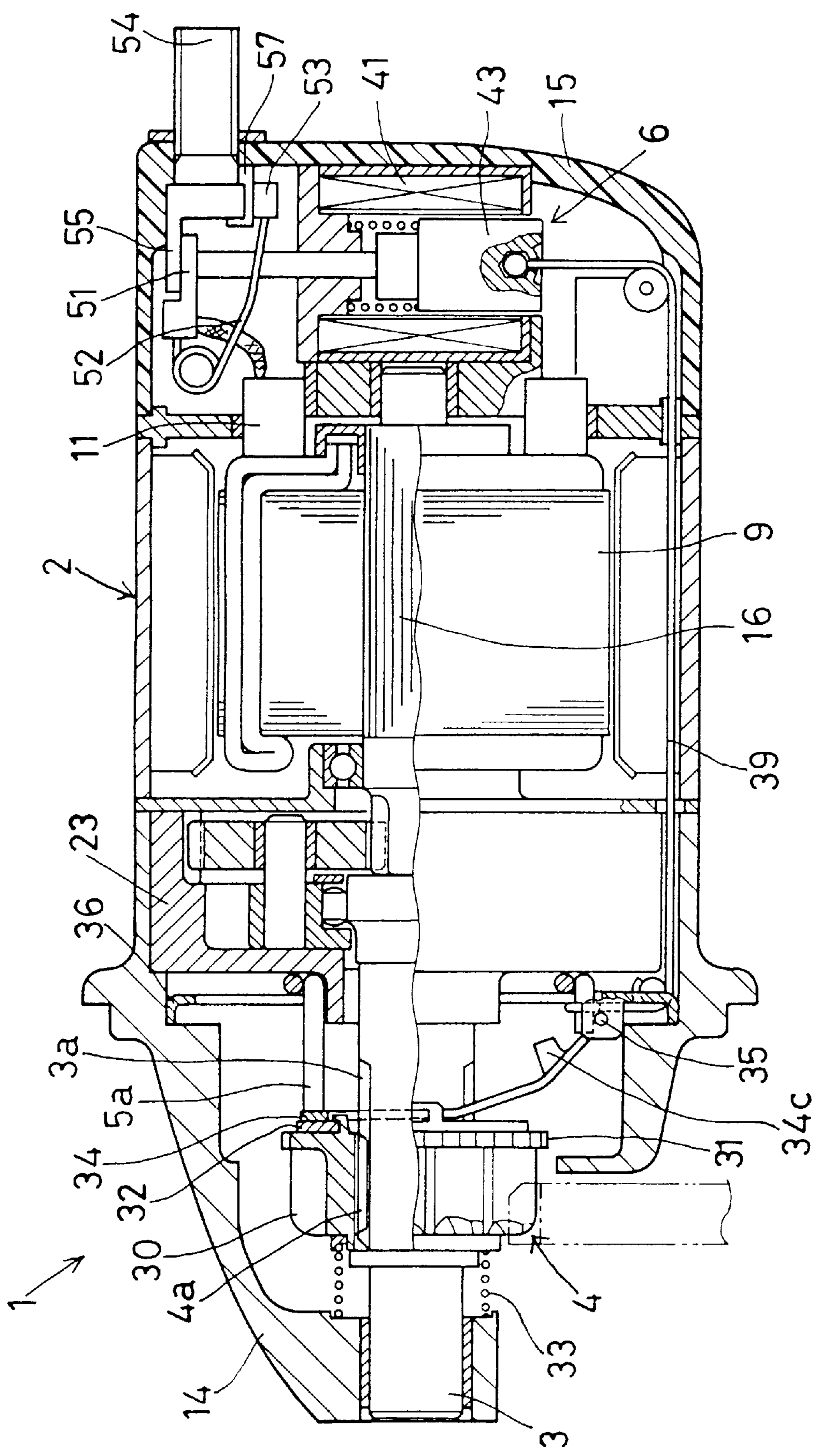

When the pinion moving body 4 turns to the position where the pinion gear 30 is enabled to engage with the ring gear 29, the pinion moving body 4 advances further to cause a complete meshing engagement between the pinion gear 30 and the ring gear 29. As a result, the upper extension 5*a* of the rotation restricting member 5 disengages from the teeth 31*a* of the flange 31 and the lower extension 5*b* also disengages from the receiving part 34*c* of the plate 34, thus enabling the rotation restricting member 5 to move. Thus, as the plunger 43 having been restricted from moving is attracted further, the main movable contact 51 abuts the main fixed contact 55 thereby turning on the second switch. The current supplied from the battery 48 flows to the armature 9 through the second switch and the brush 11. The second switch short-circuits the resistor wire 56. Thus, the armature 9 applied with the rated full voltage rotates at high speeds. The rotation of the armature 9 is transmitted to the output shaft 3 and rotates the ring gear 29 engaged with the pinion gear 30 for starting the engine. Here, the upper extension 5*a* disengaged from the teeth 31*a* of the flange 31 drops into the rear side of the plate 34 (FIG. 7), because the entire body of the rotation restricting member 5 is pulled to move downward.

While the pinion gear 30 is in engagement with the ring gear 29, the biasing force of the spring 33 that biases the pinion moving body 4 increases. The pinion gear 30 is rotated by the ring gear 29 after the engine starting, the rotary force of the engine acts in a direction to move back the pinion moving body 4 by the action of the helical splines 3*a*, 4*a*. At this moment, as the upper extension 5*a* having dropped behind the rear end side of the plate 34 supports the rear end side of the plate 34 against the retreating force acting on the pinion moving body 4, the pinion moving body 4 is restricted from retreating.

When the key switch 47 is turned off after engine starting, the supply of current to the coil 41 of the electromagnetic switch 6 is interrupted and the attraction force of the plunger 43 disappears. The plunger 43 is returned to the rest position (position shown in FIG. 1) by the reaction force of the return spring 44. Thus, the first switch and the second switch are turned off sequentially and the current supply to the armature 9 is interrupted, thereby stopping rotation of the armature 9. With the return of the plunger 43, the force by which the rotation restricting member 5 has been being pulled through the cord-like member 39 disappears and the rotation restricting member 5 is pushed back upward in FIG. 1 by the reaction force of the spring. As a result, as the pinion moving body 4 is released from being restricted from retreating by the upper extension 5*a*, the pinion moving body 4 moves rearward on the output shaft 3 to the rest position by the retreating force exerted on the pinion moving body 4.

In the present embodiment, the lower extension 5*b* of the rotation restricting member 5 abuts the receiving part 34*c* of the plate 34 to restrict the movement (downward movement in FIG. 1) of the rotation restricting member 5 during the period from the collision to the complete meshing engagement between the pinion gear 30 and the ring gear 29. Thus, as the upper extension 5*a* engaged with the tooth 31*a* of the flange 31 is not pulled down by the plunger 43, the upper protrusion 5*a* made of the resilient wire material is restricted from flexing downward. As the rotation restricting member 5 is constructed by a single resilient wire from the upper extension 5*a* to the lower extension 5*b*, the lower extension 5*b* is also resilient. However, the lower extension 5*b* is shorter than the upper extension 5*a*. Further, the distance between the part that abuts the receiving part 34*c* of the plate 34 and the part that is connected to the cord-like member 39 is set short. Therefore, even when the lower extension 5*b* is pulled down by the cord-like member 39 with its free end side being maintained received on the receiving part 34*c*, the lower extension 5*b* is less likely to bend or flex greatly and the amount of bending is small enough.

Thus, as the plunger 43 is restricted from moving until the pinion gear 30 completely meshes with the ring gear 29, the second switch is restricted from turning on without fail. As a result, it does not occur that the pinion gear 30 starts to mesh with the ring gear 29 at high speed. Thus, the collision impact at the time of engagement can be reduced and breakage of the pinion gear 30 and the ring gear 29 can be reduced. Further, with the reduction in the impact shock at the time of engagement, the driving component parts (reduction mechanism, clutch, output shaft 3, pinion gear 30, front casing 14 and the like) for transmitting the rotary force of the starter motor 2 can be made light-weight. Still further, the noise at the time of engagement can be reduced as well.

Figure 8:
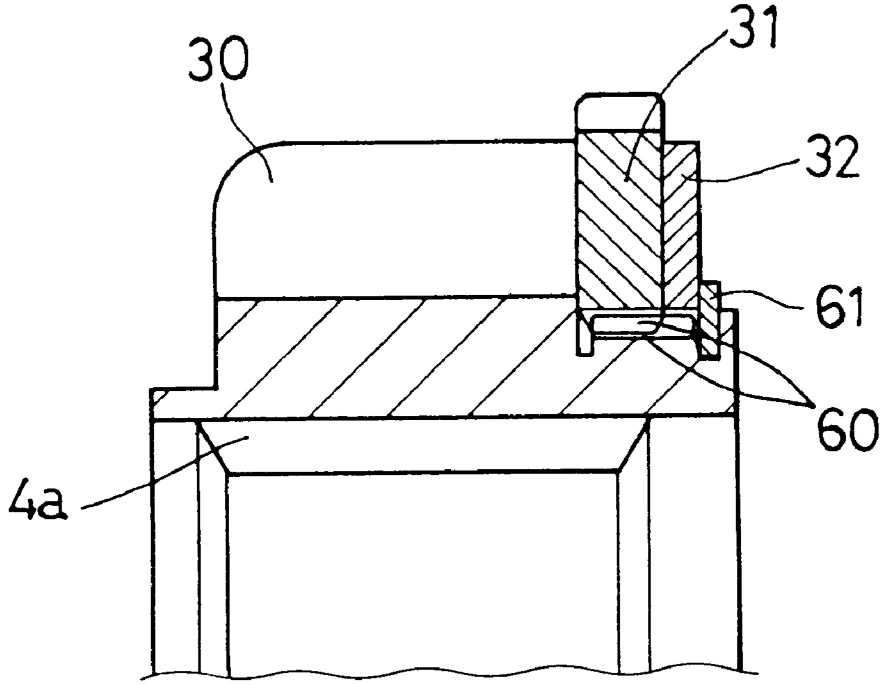
FIG. 8 is a sectional view of the starter showing a modification of a pinion moving body used in the embodiment.

Although the pinion gear 30 and the flange 31 are integrated into a single unit in the above embodiment, the pinion gear 30 and the flange 31 may be provided separately as shown in FIG. 8 so that both parts 30, 31 are coupled through straight splines 60. Further, the thrust washer 32 may be held by a circular clip 61 as shown in FIG. 8.

The present embodiment may be modified further without departing from the spirit of the invention.

What is claimed is:

1. A starter comprising:

a starter motor for generating rotating force;

an output shaft rotatable by the starter motor;

a pinion moving body having a pinion gear engageable with a ring gear of an engine, the pinion moving body being engaged on an outer periphery of the output shaft through a helical spline;

a power supply circuit having a first switch and a second switch, wherein the power supply circuit supplies electric power to the starter motor through an electric resistor during a turn-on of the first switch and thereafter supplies the electric power to the starter by short-circuiting the electric resistor during a turn-on of the second switch;

an electromagnetic switch having a coil for generating magnetic force and a plunger attractable by the magnetic force generated by the coil, the plunger being movable to turn on the first switch and then the second switch;

a rotation restricting member made of a resilient material and engageable with the pinion moving body by receiving a movement of the plunger for restricting rotation of the pinion moving body; and a movement restricting member provided separately from the rotation restricting member for restricting the movement of the plunger until the pinion moving body, being rotation-restricted by the rotation restricting member, advances a predetermined distance on the output shaft by rotation of the output shaft after the turn-on of the first switch, wherein the movement restricting member allows for the movement of the plunger to turn on the second switch only after the rotation restricting member advances the predetermined distance.

2. A starter comprising:

a starter motor for generating rotating force;

an output shaft rotatable by the starter motor;

a pinion moving body having a pinion gear engageable with a ring gear of an engine, the pinion moving body being engaged on an outer periphery of the output shaft through a helical spline;

a power supply circuit having a first switch and a second switch, wherein the power supply circuit supplies electric power to the starter motor through an electric resistor during a turn-on of the first switch and thereafter supplies the electric power to the starter by short-circuiting the electric resistor during a turn-on of the second switch;

an electromagnetic switch having a coil for generating magnetic force and a plunger attractable by the magnetic force generated by the coil, the plunger being movable to turn on the first switch and then the second switch;

a rotation restricting member made of a resilient material and engageable with the pinion moving body by receiving a movement of the plunger for restricting rotation of the pinion moving body; and a movement restricting member for restricting the movement of the plunger until the pinion moving body, being rotation-restricted by the rotation restricting member, advances a predetermined distance on the output shaft by rotation of the output shaft after the turn-on of the first switch, wherein:

the movement restricting member has a first engagement part movable together with the pinion moving body and a second engagement part movable together with the plunger; and the movement restricting member restricts the movement of the plunger by restricting the movement of the second engagement part through abutment of the second engagement part with the first engagement part after the turn-on of the first switch.

3. The starter as in claim 2, wherein:

the rotation restricting member is provided integrally with the second engagement part and the abutment thereof with the first engagement part is released when the pinion moving body advances forward the predetermined distance on the output shaft.

4. The starter as in claim 1, wherein:

the predetermined distance corresponds to a forward movement of the pinion moving body to a complete meshing engagement of the pinion gear with the ring gear.

5. The starter as in claim 1, wherein:

the rotation restricting member has a resilient upper extension for engagement with the pinion moving body and a resilient lower extension connected with the plunger and having a length shorter than the upper extension.

6. The starter as in claim 1, wherein the movement restricting member is held immovably with respect to the movement of the plunger.

7. The starter as in claim 6, wherein the movement restricting member is engaged with the pinion moving body to move with only the pinion moving body.

8. The starter as in claim 1, wherein the rotation restriction member is held movably in a direction perpendicular to a direction of movement of the pinion moving body along the output shaft, and the movement restricting member is held immovably in the direction perpendicular to the direction of movement of the pinion moving body along the output shaft.

9. A starter comprising:

a starter motor for generating rotating force;

an output shaft rotatable by the starter motor;

a pinion moving body having a pinion gear engageable with a ring gear of an engine, the pinion moving body being engaged on an outer periphery of the output shaft to move thereon;

a power supply circuit for supplying electric power to the starter motor for rotation at low speed first and then at high speed;

an electromagnetic switch having a plunger movable to control the electric power to the starter motor;

a rotation restricting member connected to the plunger and having a resilient part engageable with the pinion moving body for restricting rotation of the pinion moving body to advance the pinion gear toward the ring gear; and a movement restricting member provided separately from the rotation restricting member for restricting the movement of the resilient part against the pinion moving body from an engagement of the resilient part with the pinion moving body until a meshing engagement of the pinion gear with the ring gear, wherein the movement restricting member allows for the movement of the resilient part only after the meshing engagement of the pinion gear causing the power supply circuit to switch the electric power for rotation from the low speed to the high speed.

10. The starter as in claim 9, wherein:

the rotation restricting member is made of a resilient material and has another resilient part connected to the plunger, the another resilient part being shorter than the resilient part engageable with the pinion moving body; and the movement restricting member has a receiving part for receiving the another resilient part thereby to restrict the movement of the resilient part engageable with the pinion moving body.

11. The starter as in claim 10, wherein:

the movement restricting member is movable with the pinion moving body causing the another resilient part be disengaged from the receiving part when the pinion gear engages with the ring gear.

12. The starter as in claim 11, wherein:

the power supply circuit has a first switch and a second switch;

the first switch is turned on by the plunger for the low speed rotation of the starter motor; and the second switch is turned on by the plunger after the first switch is turned on and the another resilient part is disengaged from the receiving part.

13. The starter as in claim 9, wherein the movement restricting member is held immovably with respect to the movement of the plunger.

14. The starter as in claim 9, wherein the rotation restriction member is held movably in a direction perpendicular to a direction of movement of the pinion moving body along the output shaft, and the movement restricting member is held immovably in the direction perpendicular to the direction of movement of the pinion moving body along the output shaft.

* * * * *